(12) United States Patent
Long

(10) Patent No.: US 9,586,251 B2
(45) Date of Patent: Mar. 7, 2017

(54) PIPE BENDER

(71) Applicant: ZHONGSHAN OMS INDUSTRIAL CO., LTD., Zhongshan (CN)

(72) Inventor: Xiaobin Long, Zhongshan (CN)

(73) Assignee: OMS MACHINERY CO., LTD., Zhongshan (CN)

( * ) Notice: Subject to any disclaimer, the term of this patent is extended or adjusted under 35 U.S.C. 154(b) by 344 days.

(21) Appl. No.: 13/736,053

(22) Filed: Jan. 7, 2013

(65) Prior Publication Data

US 2013/0118224 A1 May 16, 2013

Related U.S. Application Data

(63) Continuation-in-part of application No. PCT/CN2011/082768, filed on Nov. 23, 2011.

(30) Foreign Application Priority Data

Dec. 9, 2010 (CN) .......................... 2010 1 0592786

(51) Int. Cl.
*B21D 7/00* (2006.01)
*B21D 7/02* (2006.01)
(Continued)

(52) U.S. Cl.
CPC ................. *B21D 7/00* (2013.01); *B21D 1/02* (2013.01); *B21D 7/02* (2013.01); *B21D 7/021* (2013.01); *B21D 11/22* (2013.01); *B21D 21/00* (2013.01); *B21D 37/04* (2013.01); *B21D 43/006* (2013.01); *B23P 15/26* (2013.01)

(58) Field of Classification Search
CPC ... B21D 7/04; B21D 7/00; B21D 7/02; B21D 7/021; B21D 7/06; B21D 7/12; B21D 43/006; B21D 11/22; B21D 53/06; B23P 15/26

USPC ................. 72/149, 152, 156, 157, 159, 324, 72/419–421, 428
See application file for complete search history.

(56) References Cited

U.S. PATENT DOCUMENTS

2004/0200253 A1* 10/2004 Schmauder et al. ............ 72/149

FOREIGN PATENT DOCUMENTS

CN          1978087 A   *   6/2007
CN        201969759 U   *   9/2011

* cited by examiner

*Primary Examiner* — Shelley Self
*Assistant Examiner* — Patrick Gunson
(74) *Attorney, Agent, or Firm* — Matthias Scholl, PC; Matthias Scholl

(57) ABSTRACT

A pipe bender, including: a base; a frame including a position switching mechanism, a first position switching assembly, and a bending stand including a second position switching assembly; a calibration device; a feeding device; a cutting device; a feeding path arranged transversely; a bending device; a receiving device arranged longitudinally; and a controller. The calibration device includes two calibration mechanisms including separate processing paths to calibrate two kinds of pipes having different diameters. The feeding device includes two feeding channels for transporting the two kinds of pipes, and the first position switching assembly is used for aligning the two feeding channels with the feeding path in turn. The bending device includes two bending channels for bending the two kinds of pipes, and the second position switching assembly is used for aligning the two bending channels with the feeding path in turn.

20 Claims, 19 Drawing Sheets

(51) Int. Cl.
*B21D 1/02* (2006.01)
*B21D 11/22* (2006.01)
*B21D 21/00* (2006.01)
*B21D 43/00* (2006.01)
*B23P 15/26* (2006.01)
*B21D 37/04* (2006.01)

PIPE BENDER

CROSS-REFERENCE TO RELATED APPLICATIONS

This application is a continuation-in-part of International Patent Application No. PCT/CN2011/082768 with an international filing date of Nov. 23, 2011, designating the United States, now pending, and further claims priority benefits to Chinese Patent Application No. 201010592786.2 filed Dec. 9, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

Field of the Invention

The invention relates to a pipe bender for preparing long U-shaped pipes, and more particularly to a pipe bender for preparing long U-shaped pipes capable of processing two kinds of pipes having different diameters.

Description of the Related Art

As a compact heat exchanger, the finned tube heat exchanger is widely used in the refrigeration industry. With the development of technology in the air conditioning and the refrigeration industry, and the implementation of the environmental regulations, more and more strict requirements have been imposed on the heat transfer performance of the heat exchanger in order to make up for the low performance of the refrigerant. The structure of the heat exchanger (the type of the heat exchange tube and the fin tube) and the forming process of the heat exchanger are important factors that affect the heat transfer performance and have great significance in improving the integral heat transfer performance. The forming process of the heat exchanger mainly includes three kinds: bending to form a U-shaped pipe; expanding mechanical tubes to achieve the connection of the tube and the fin; and bending pipe bundles to form an L-shaped or a G-shaped heat exchanger.

Currently, when the long U-shaped pipes are bent by a pipe bender, a calibration device, a feeding device, and a bending device must be chosen correspondingly based on the diameter of the pipes. However, if the pipes to be processed are two kinds having different diameters, some components of the calibration device, the feeding device, and the bending device must be replaced, which is very inconvenient and troublesome.

SUMMARY OF THE INVENTION

In view of the above-described problems, it is one objective of the invention to provide a pipe bender for preparing long U-shaped pipes.

To achieve the above objective, in accordance with one embodiment of the invention, there is provided a pipe bender, comprising: a base; a frame comprising a position switching mechanism, a first position switching assembly, and a bending stand comprising a second position switching assembly; a calibration device; a feeding device; a cutting device; a feeding path arranged transversely; a bending device; a receiving device arranged longitudinally; and a controller.

The calibration device comprises two calibration mechanisms comprising separate processing paths to calibrate two kinds of pipes having different diameters, and the position switching mechanism is used for adjusting positions of the two calibration mechanisms and aligning the two processing paths with the feeding path in turn.

The feeding device comprises two feeding channels for transporting the two kinds of pipes, and the first position switching assembly is used for aligning the two feeding channels with the feeding path in turn.

The bending device comprises two bending channels for bending the two kinds of pipes, and the second position switching assembly is used for aligning the two bending channels with the feeding path in turn.

In a class of this embodiment, the position switching mechanism comprises: a lifting guide member, a lifting drive member, an upper board, and a lower board. The two calibration mechanisms are disposed on the upper board and the lower board, respectively. The lifting guide member is fixed on the frame and fits with the two boards slidably so that the two boards are upwardly and downwardly movable on the lifting guide member. The upper board is disposed on the lower board via a spacer. The lifting drive member is disposed between the frame and the lower board; and driven by the lifting drive member, the two boards are lifted or descended so that the processing paths of the two boards are aligned with the feeding path in turn.

In a class of this embodiment, the lifting guide member is a guide pillar uprightly fixed on the frame. The two boards are square in shape, and four guide pillars go through four angles of each board. A bearing sleeve is fixed on the board, and the guide pillar goes through the bearing sleeve for guiding. The lifting drive member is a cylinder uprightly fixed on the frame, and a piston rod of the cylinder is extended upwards and is in fixed connection with the lower board. The spacer is a sleeve sleeving the guide pillar.

In a class of this embodiment, the frame comprises a limiting column; when the lower board leans against a top of the limiting column, the processing path of the calibration mechanism of the upper board is aligned with the feeding path. The frame further comprises a removable cushion pillar, and when the lower board leans against a top of the removable cushion pillar, the processing path of the calibration mechanism of the lower board is aligned with the feeding path.

In a class of this embodiment, the feeding device comprises a first bottom plate comprising a first operating position and a second operating position on the frame, and a distance between the first operating position and the second operating position is equal to a distance between centers of the two feeding channels. When the first bottom plate is at the first operating position, one feeding channel is aligned with the feeding path; and when the first bottom plate is at the second operating position, the other feeding channel is aligned with the feeding path. The first position switching assembly comprises: a first guiding mechanism, a first switching mechanism, and a locating mechanism. The first switching mechanism drives the first bottom plate to move between the first operating position and the second operating position along a direction determined by the first guiding mechanism. The locating mechanism locates the first bottom plate on the frame and aligns an anticipated feeding channel with the feeding path.

In a class of this embodiment, the locating mechanism comprises: a front locating member, and a rear locating member, both of which are disposed on the frame. The first bottom plate comprises: a front locating surface, and a rear locating surface. When the first bottom plate is at the first operating position, the front locating surface leans against the front locating member; and a distance between the rear locating surface and the rear locating member is equal to the distance between the first operating position and the second operating position. When the first bottom plate is at the second operating position, the rear locating surface leans against the rear locating member.

In a class of this embodiment, the first guiding mechanism comprises: a guide rail longitudinally fixed on the frame, and a sliding block fixed on a bottom of the first bottom plate. The sliding block slidably fits the guide rail and slides in a longitudinal direction. The first switching mechanism comprises: a front pusher, and a rear pusher, both of which are disposed on the frame. When the first bottom plate is at the first operating position, a front end of the rear pusher leans against the rear locating surface; and when the first bottom plate is at the second operating position, a rear end of the front pusher leans against the front locating surface.

In a class of this embodiment, the front locating member, the rear locating member, the front pusher, and the rear pusher are all bolts.

In a class of this embodiment, the bending device comprises: a bending stand, a second bottom plate, a bending mould, and a threaded coupling mechanism. The bending mould comprises a longitudinally arranged rotational center line and two bending channels. The second bottom plate is fixed on the bending stand via the threaded coupling mechanism. The second position switching assembly comprises: a longitudinal locating mechanism, a lifting locating mechanism, a second guiding mechanism, and a second switching mechanism. The second bottom plate comprises a first operating position and a second operating position on the bending stand; a preset longitudinal difference and a preset height difference exist between the first operating position and the second operating position. The longitudinal locating mechanism comprises: a front locating member, and a rear locating member, both of which are disposed on the second bottom plate. The bending stand comprises: a front locating surface, and a rear locating surface. When the second bottom plate is at the first operating position, the front locating surface leans against the front locating member, and the distance between the rear locating surface and the rear locating member is equal to the longitudinal distance between the first operating position and the second operating position. When the second bottom plate is at the second operating position, the rear locating surface leans against the rear locating member. The lifting locating mechanism comprises: at least two sliding keys, and at least two grooves. The bending stand comprises a supporting surface on which the sliding keys are fixed. A part of each sliding key, which protrudes from the supporting surface, comprises: a horizontal plane and an inclined plane; all the horizontal planes are of the same height; all the inclined planes are parallel with each other; the horizontal plane and the inclined plane intersect to form transversely arranged intersections; a height difference between the supporting surface and the horizontal plane is equal to the height difference between the first operating position and the second operating position. When the second bottom plate is at the first operating position, a bottom surface of the second bottom plate attaches to the supporting surface of the bending stand. When the second bottom plate is at the second operating position, the bottom surface of the second bottom plate attaches to the horizontal plane of the sliding key. Each groove is arranged on a bottom surface of the second bottom plate. When the second bottom plate is at the first operating position, the groove accommodates a protruding part of the sliding key. The groove comprises a side wall which is inclined and in parallel with the inclined plane of the sliding key. During the switch of the second bottom plate between the first operating position and the second operating position, the side wall attaches to the inclined plane. The second switching mechanism drives the second bottom plate to move along a direction determined by the second guiding mechanism between the first operating position and the second operating position.

In a class of this embodiment, the second guiding mechanism comprises: a guiding bar, and a guiding slot; the guiding bar is disposed on the supporting surface, and the guiding slot is arranged on the bottom surface of the second bottom plate. The guiding bar is received by the guiding slot and is movable along the guiding slot in the longitudinal direction. The second switching mechanism comprises: a nut, a screw, and a handle. The nut is disposed on the bending stand. The handle is disposed on a front end of the screw. The screw is rotationally through a mounting pedestal of the second bottom plate, and a middle part of the screw is axially positioned on the mounting pedestal via a bearing. The nut is mounted on a rear part of the screw.

Advantages of the invention are summarized as follows. The pipe bender for preparing long U-shaped pipes of the invention has a simple and reasonable structure, specific location, convenient operation, and easy manufacturing. Without displacing main assemblies, the pipe bender can process two kinds of pipes having different diameters. Thus, it has much wider ranges of processing.

The two calibration mechanisms can be first assembled, and two feeding channels and bending channels are manufactured on the feeding device and the bending mould, respectively, then the position switching mechanism and assemblies are used to switch the operating positions, so that the pipes are aligned with the calibration mechanism, the feeding channels, and the bending channels in turn, and thus, the bending of the pipes is accomplished.

BRIEF DESCRIPTION OF THE DRAWINGS

The invention is described hereinbelow with reference to the accompanying drawings, in which.

DETAILED DESCRIPTION OF THE EMBODIMENTS

Figure 1:
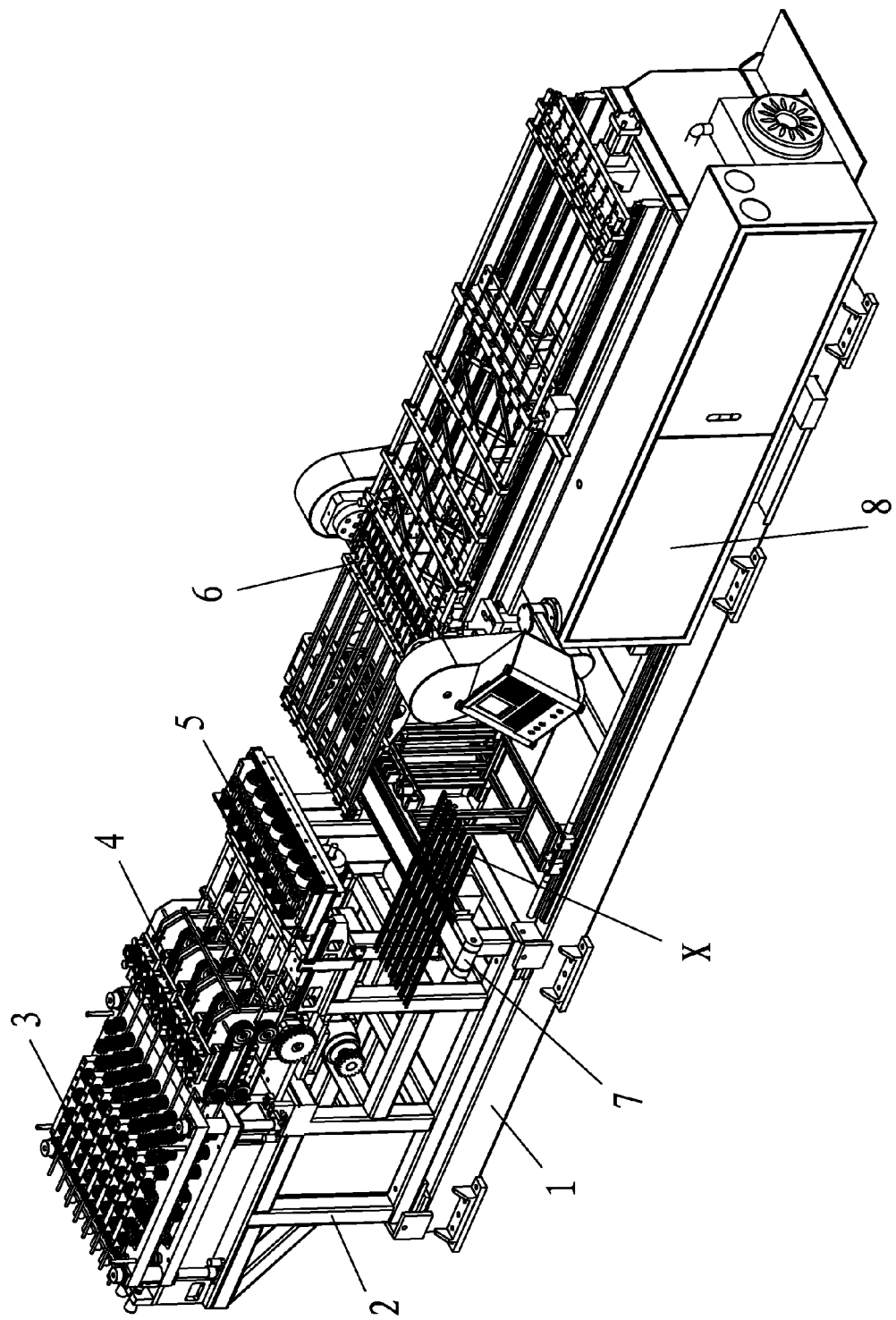
FIG. 1 is a stereogram of a pipe bender for preparing long U-shaped pipes in accordance with one embodiment of the invention.
Figure 2:
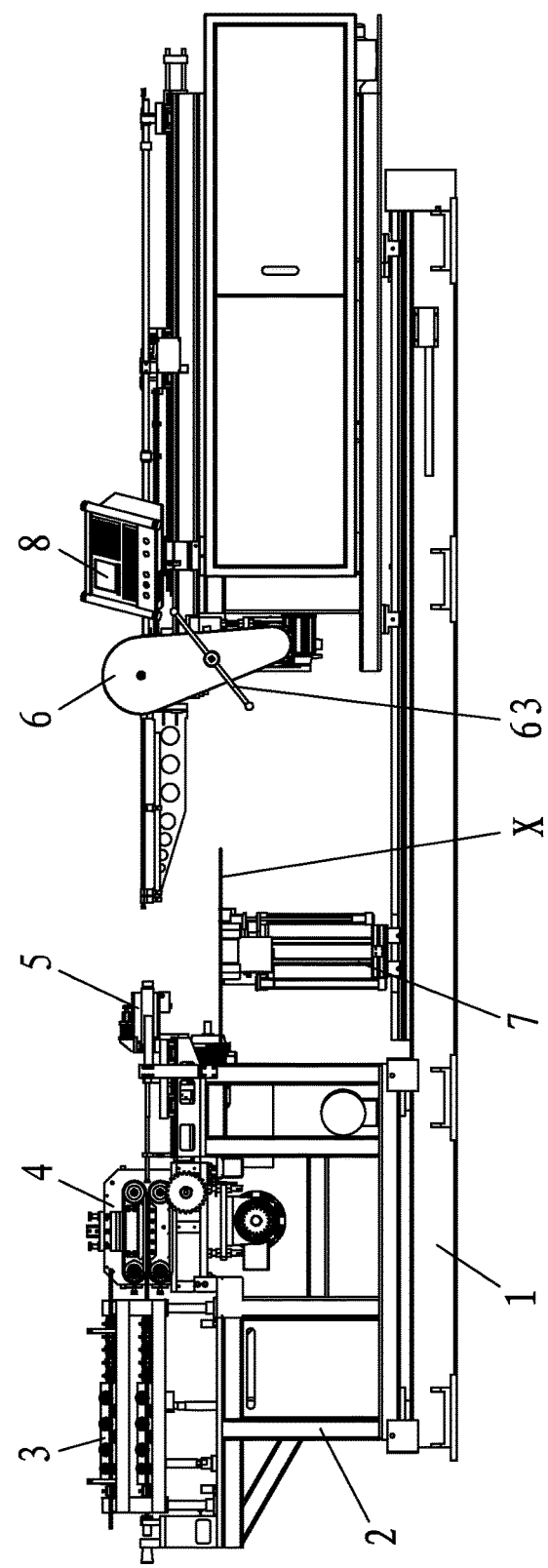
FIG. 2 is a front view of a pipe bender for preparing long U-shaped pipes in accordance with one embodiment of the invention.
Figure 3:
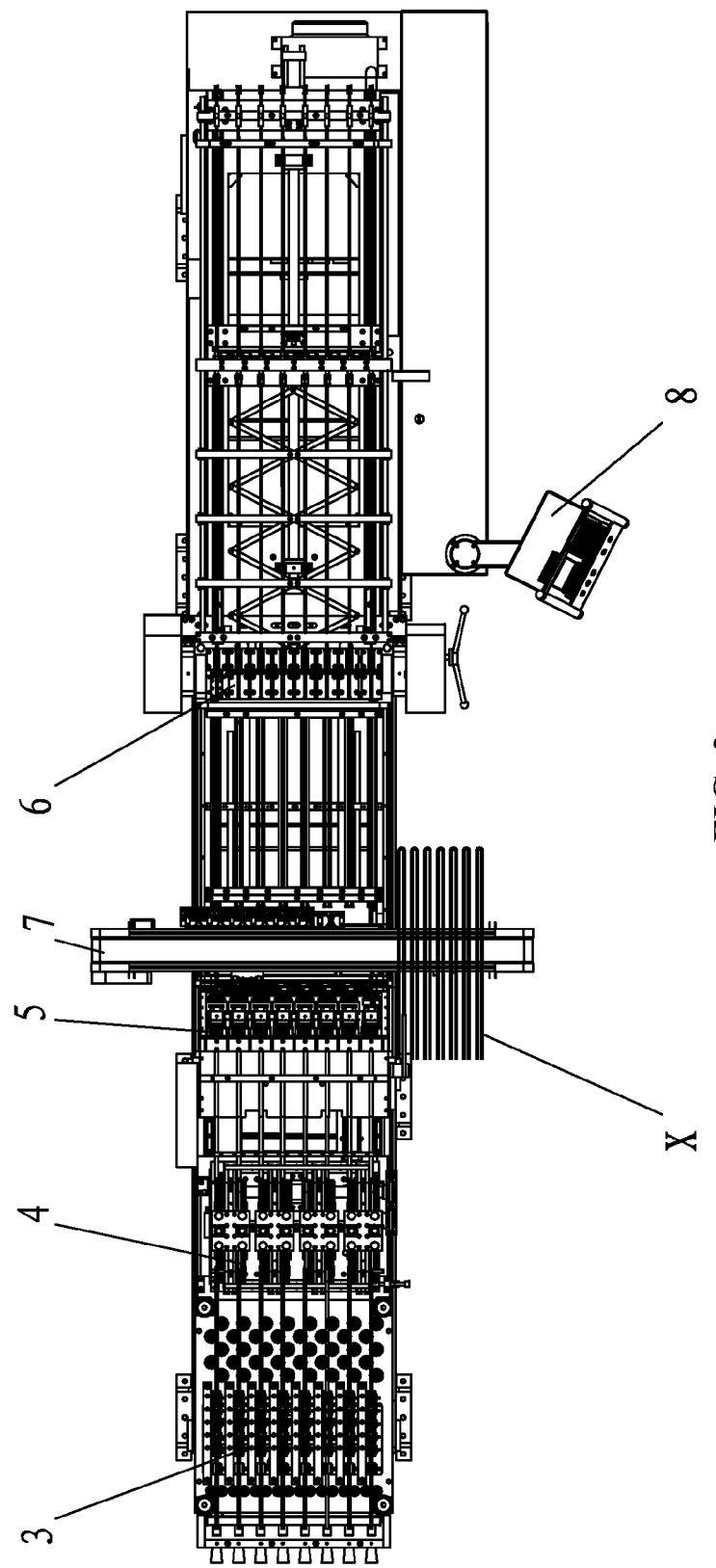
FIG. 3 is a top view of a pipe bender for preparing long U-shaped pipes of FIG. 2.

To further illustrate the invention, experiments detailing a pipe bender for preparing long U-shaped pipes are described. It should be noted that the following examples are intended to describe and not limited to the invention.

As shown in FIGS. 1-19, a pipe bender for preparing long U-shaped pipes, comprises: a base 1, a frame 2, a calibration device 3, a feeding device 4, a cutting device 5, a feeding path, a bending device 6, a receiving device 7, and a controller 8. The feeding path is transversely arranged. The receiving device is longitudinally arranged and outputs manufactured U-shaped pipes X. The frame 2 is fixed on the base 1.

The calibration device 3 comprises two calibration mechanisms 3-1 comprising separate processing paths to calibrate two kinds of pipes having different diameters (pipes in the calibration mechanism are shown in FIGS, of them, the lower pipes G are on the processing path which is also one part of the feeding path). The frame 2 comprises a position switching mechanism for adjusting positions of the two calibration mechanisms 3-1 and aligning the two processing paths with the feeding path in turn.

The feeding device 4 comprises two feeding channels S1, S2 for transporting two kinds of pipes having different diameters. The frame 2 further comprises a first position switching assembly for aligning the two feeding channels with the feeding path in turn.

The bending device 6 comprises two bending channels for bending two kinds of pipes having different diameters. A bending stand 6-1 is disposed on the frame 2 and is provided with a second position switching assembly for aligning the two bending channels with the feeding path in turn.

The position switching mechanism, which is used to adjust positions of the two calibration mechanisms 3-1, comprises: a lifting guide member 10-1, a lifting drive member 10-2, an upper board 10-3a, and a lower board 10-3b. The two calibration mechanisms 3-1 are disposed on the upper board 10-3a and the lower board 10-3b, respectively. The lifting guide member 10-1 is fixed on the frame 2 and sliding fits the two boards 10-3a and 10-3b so that the boards 10-3a and 10-3b are upwardly and downwardly movable on the lifting guide member 10-1. The upper board 10-3a is disposed on the lower board 10-3b via a spacer 10-4. The lifting drive member 10-2 is disposed between the frame 2 and the lower board 10-3b; driven by the lifting drive member 10-2, the two boards 10-3a and 10-3b are lifted so that the processing paths of each board are aligned with the feeding path in turn.

The lifting guide member 10-1 is a guide pillar uprightly fixed on the frame 2. The board 10-3a or 10-3b is square in shape. Four guide pillars go through four angles of each board 10-3a or 3b. A bearing sleeve 10-5 is fixed on the board 10-3a or 10-3b, and the guide pillar goes through the bearing sleeve 10-5 for guiding. The lifting drive member 10-2 is a cylinder uprightly fixed on the frame 2, a piston rod 10-2-1 of the cylinder is extended upwards and is in fixed connection with the lower board 10-3b. The spacer 10-4 is a sleeve sleeving the guide pillar.

The frame 2 comprises a limiting column 10-6. When the lower board 10-3b leans against a top of the limiting column 10-6, the processing path of the calibration mechanism 3-1 on the upper board 10-3a is aligned with the feeding path.

Figure 4:
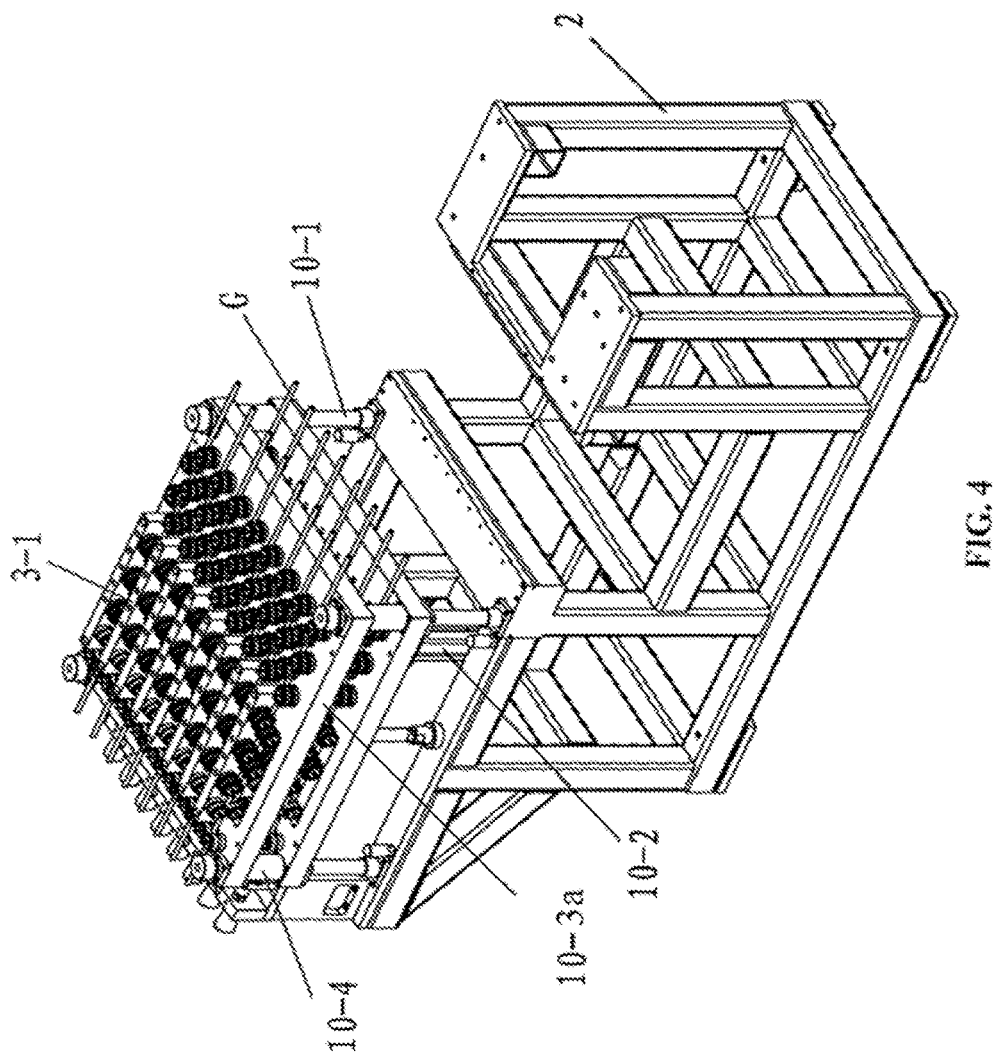
FIGS. 4 and 5 are stereograms of a frame, a calibration device, and a position switching mechanism from two different observation angles.
Figure 5:
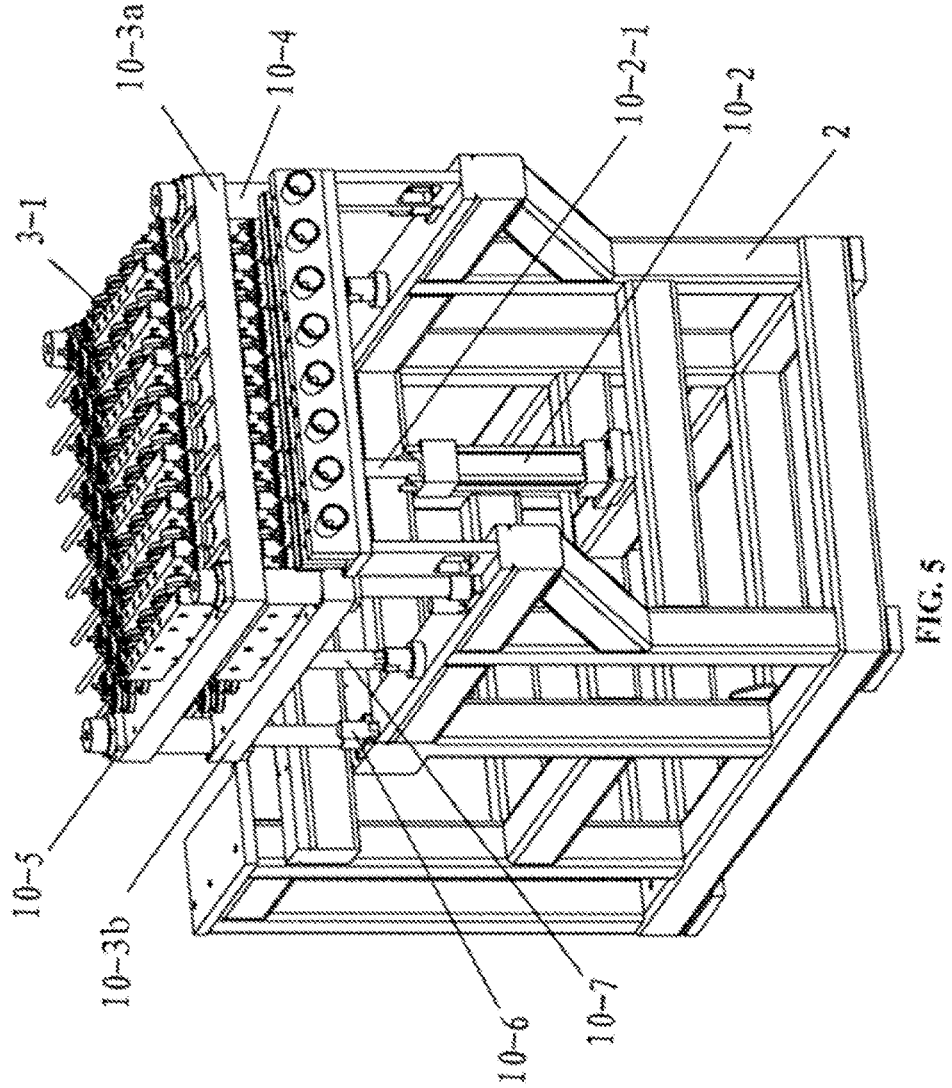
Figure 6:
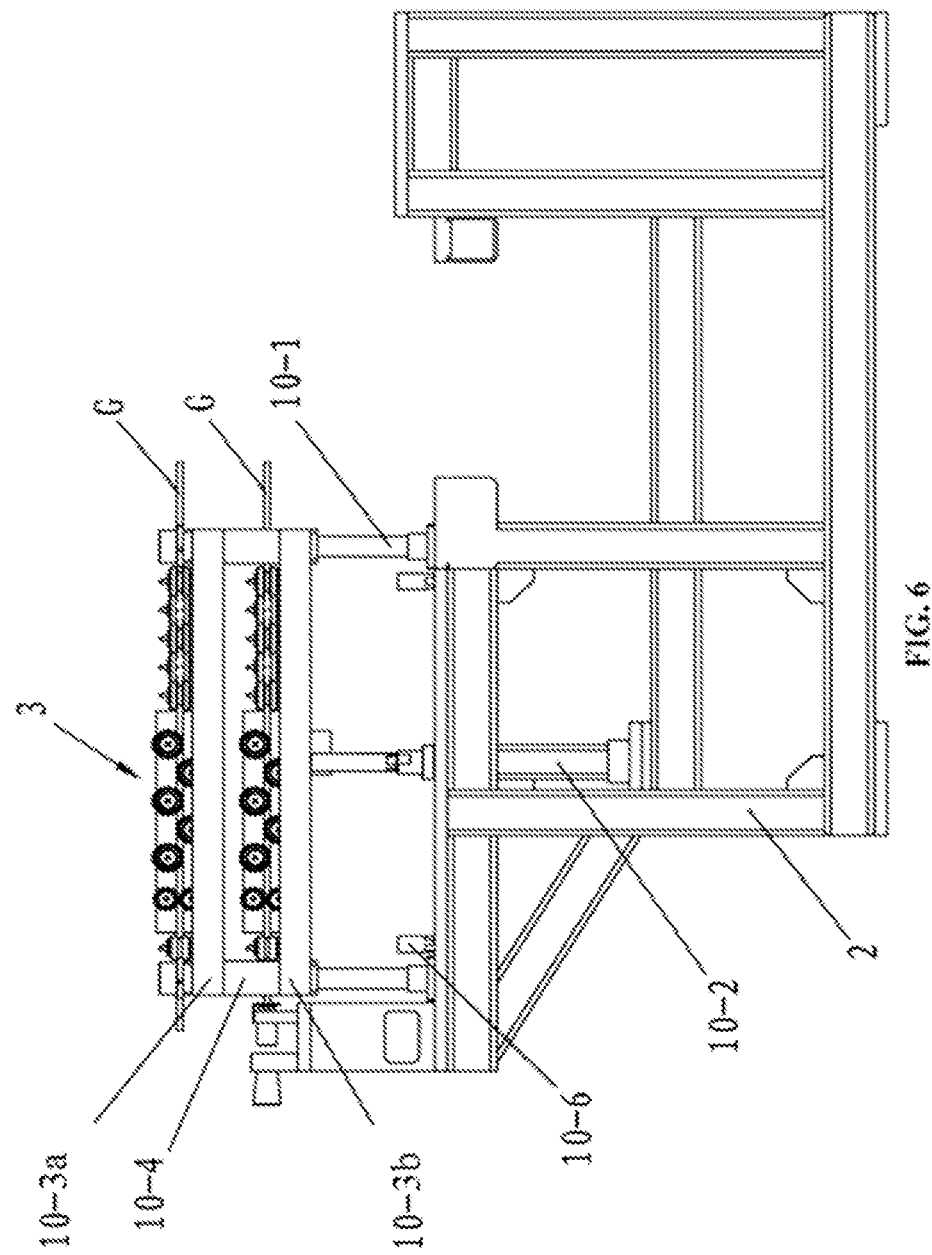
FIG. 6 is a front view of a frame, a calibration device, and a position switching mechanism in accordance with one embodiment of the invention.
Figure 7:
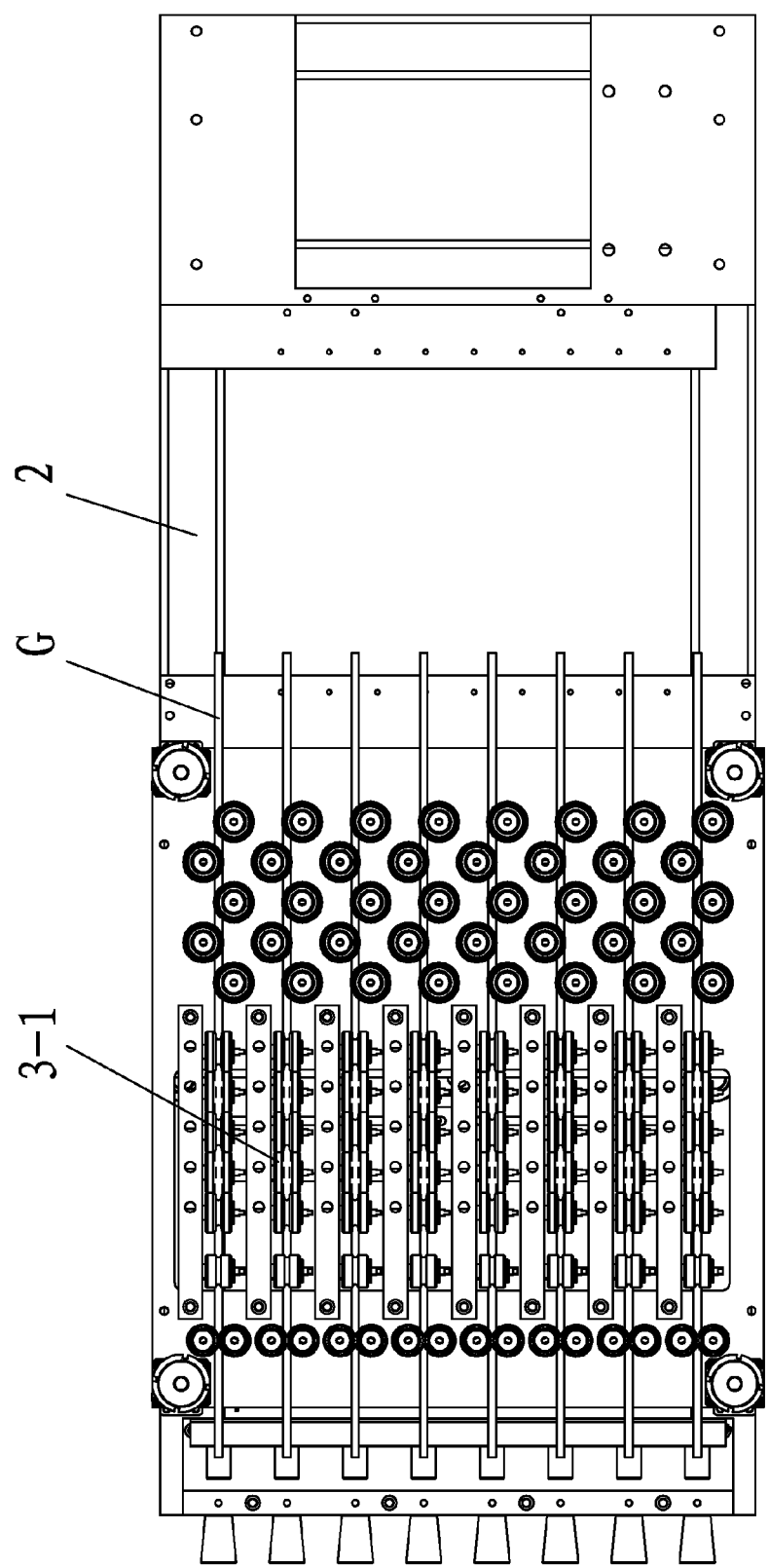
FIG. 7 is a top view of FIG. 6.
Figure 8:
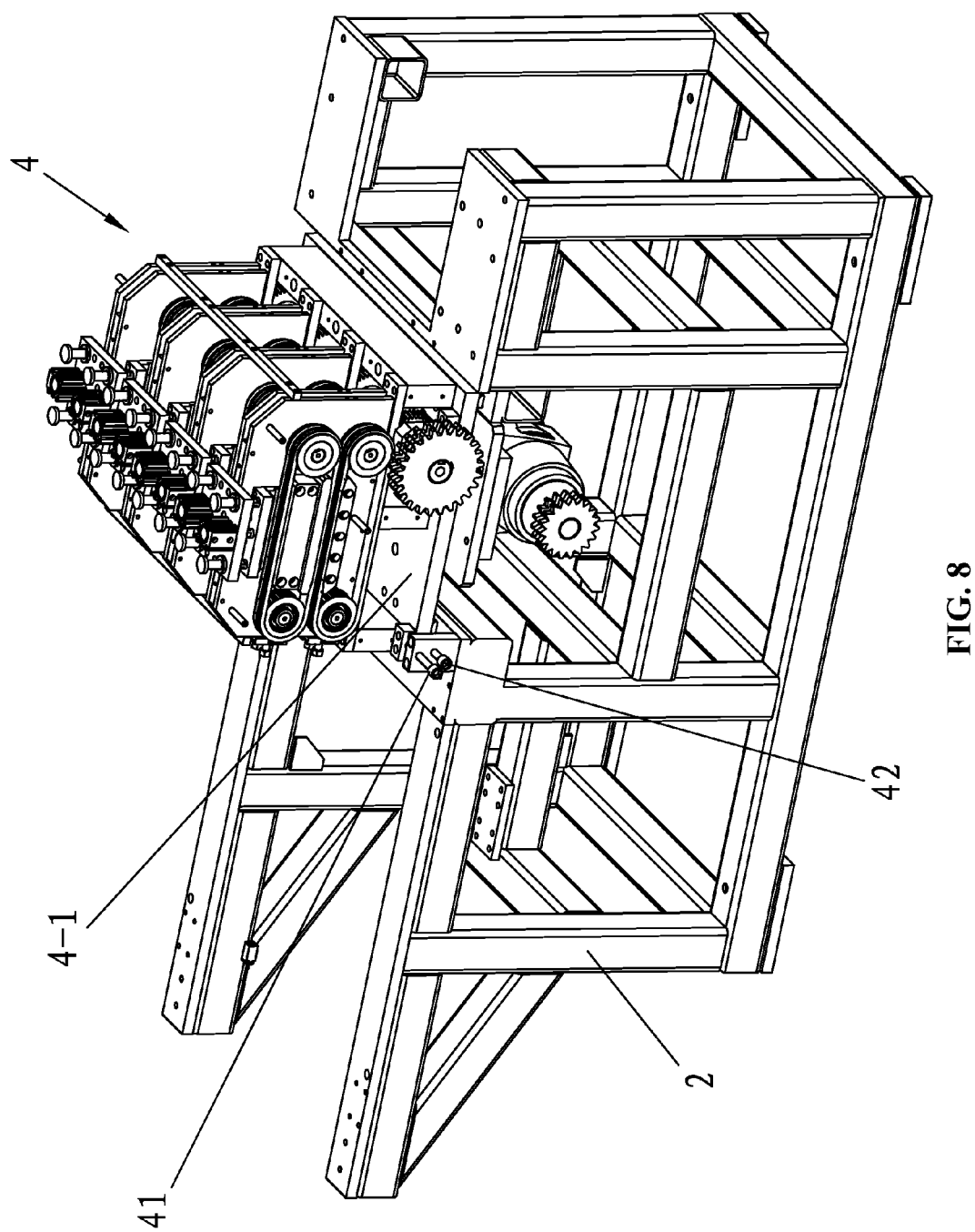
FIG. 8 is a stereogram of a frame, a feeding device, and a first position switching assembly in accordance with one embodiment of the invention.
Figure 9:
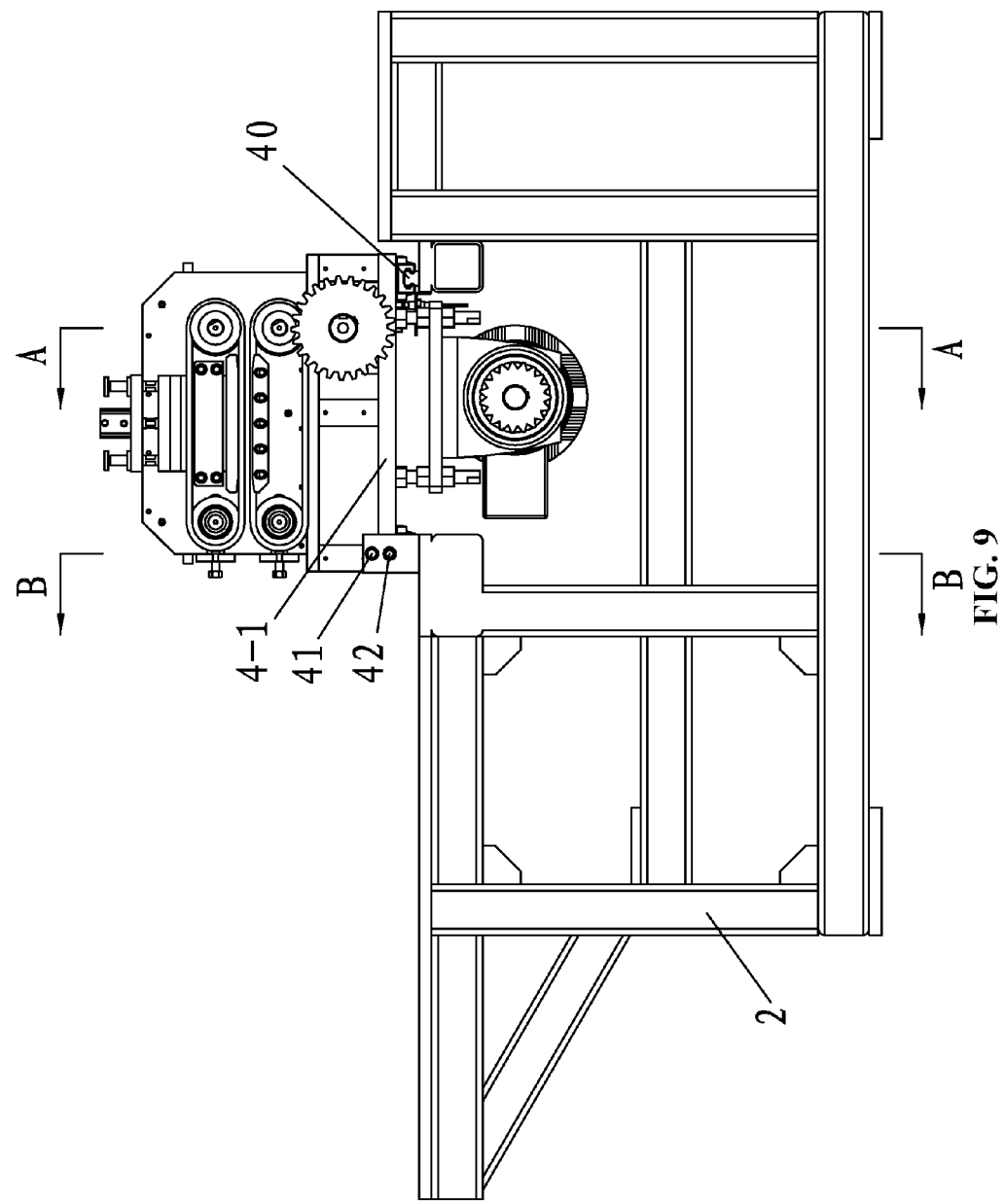
FIG. 9 is a front view of a frame, a feeding device, and a first position switching assembly in accordance with one embodiment of the invention.

The frame 2 is provided with a removable cushion pillar 10-7. When the lower board 10-3b leans against a top of the removable cushion pillar 10-7, the processing path of the calibration mechanism 3-1 on the lower board 10-3b is aligned with the feeding path (as shown in FIGS. 4-6).

The lifting guide member 10-1 is a guide pillar uprightly fixed on the frame 2. The board 10-3 is square in shape. Four guide pillars go through four angles of each board 10-3. A bearing sleeve 10-5 is fixed on the board 10-3, and the guide pillar goes through the bearing sleeve 10-5 for guiding. The lifting drive member 10-2 is a cylinder uprightly fixed on the frame 2, a piston rod 10-2-1 of the cylinder is extended upwards and is in fixed connection with the lower board 10-3. The spacer 10-4 is a sleeve sleeving the guide pillar.

The frame 2 comprises a limiting column 10-6. When the lower board 10-3 leans against a top of the limiting column 10-6, the processing path of the calibration mechanism 3-1 on the upper board 10-3 is aligned with the feeding path.

The frame 2 is provided with a removable cushion pillar 10-7. When the lower board 10-3 leans against a top of the removable cushion pillar 10-7, the processing path of the calibration mechanism 3-1 on the lower board 10-3 is aligned with the feeding path (as shown in FIGS. 4-6).

The feeding device 4 comprises a first bottom plate 4-1 comprising a first operating position and a second operating position on the frame 2. A distance between the first operating position and the second operating position is equal to a distance between centers of the two feeding channels. When the first bottom plate 4-1 is at the first operating position, one feeding channel is aligned with the feeding path; when the first bottom plate 4-1 is at the second operating position, the other feeding channel is aligned with the feeding path. The first position switching assembly, which is used to adjust positions of the two feeding channels, comprises: a first guiding mechanism 40, a first switching mechanism 41, and a locating mechanism 42. The first switching mechanism 41 drives the first bottom plate 4-1 to move between the first operating position and the second operating position along a direction determined by the first guiding mechanism 40. The locating mechanism 42 locates the first bottom plate 4-1 on the frame 2 and aligns the anticipated feeding channel with the feeding path.

Figure 10:
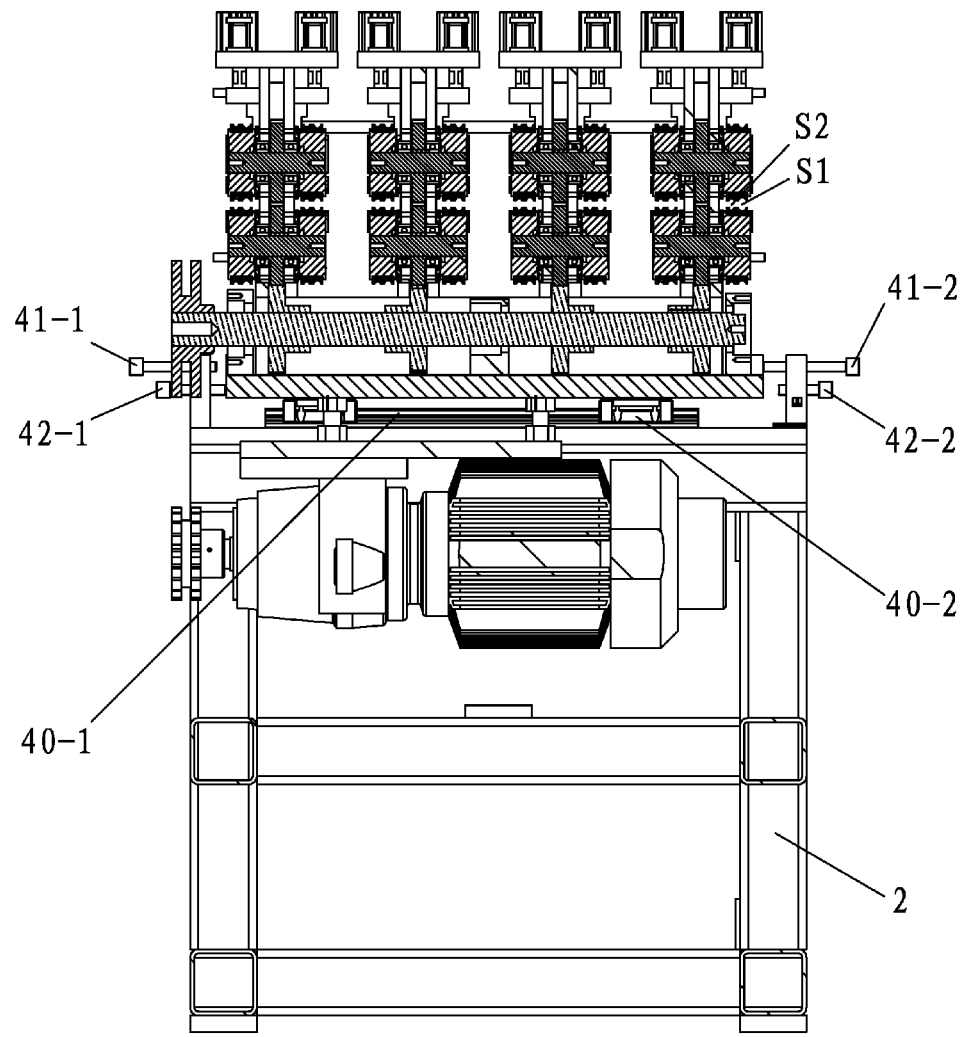
FIG. 10 is an enlarged cross-sectional view taken from line A-A of FIG. 9.
Figure 11:
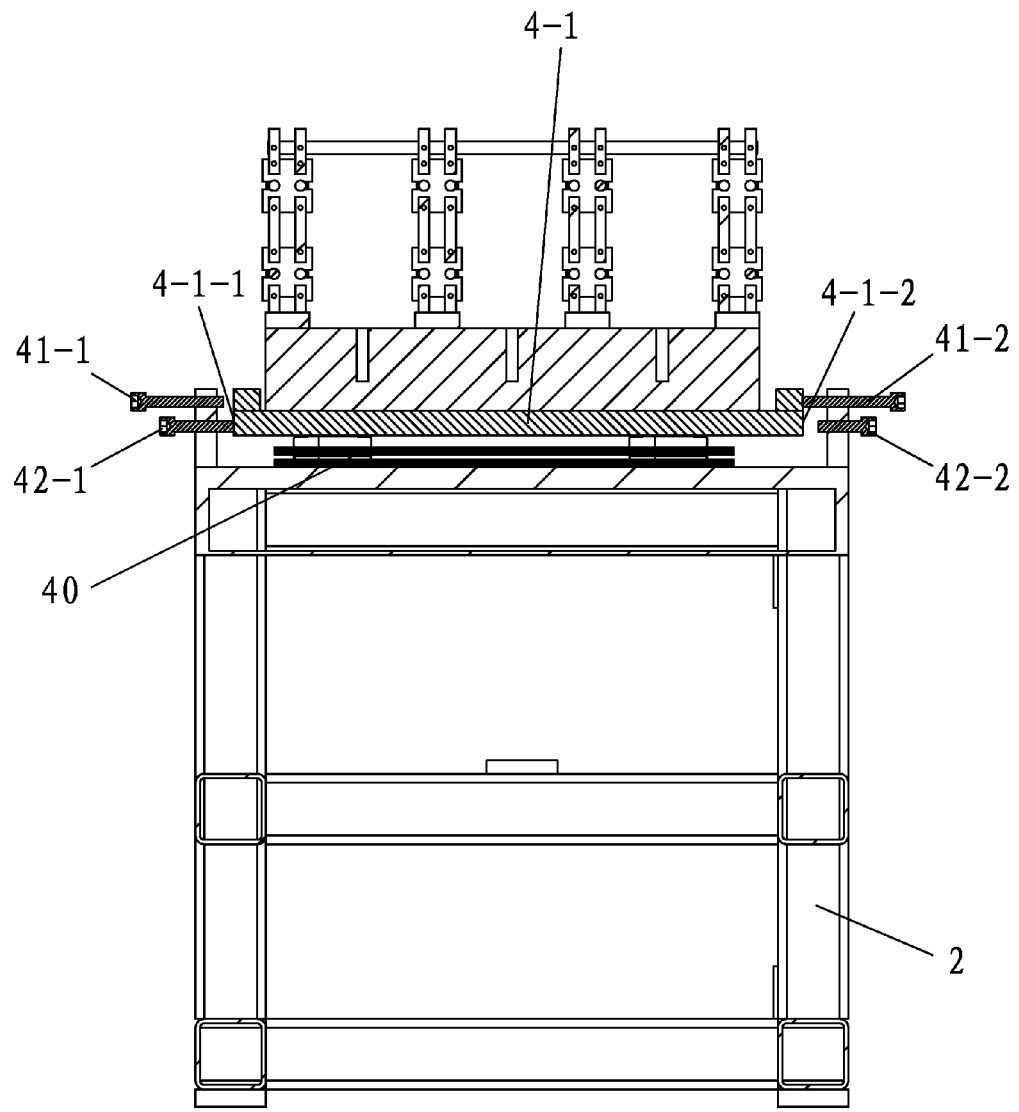
FIG. 11 is an enlarged cross-sectional view taken from line B-B of FIG. 10.
Figure 12:
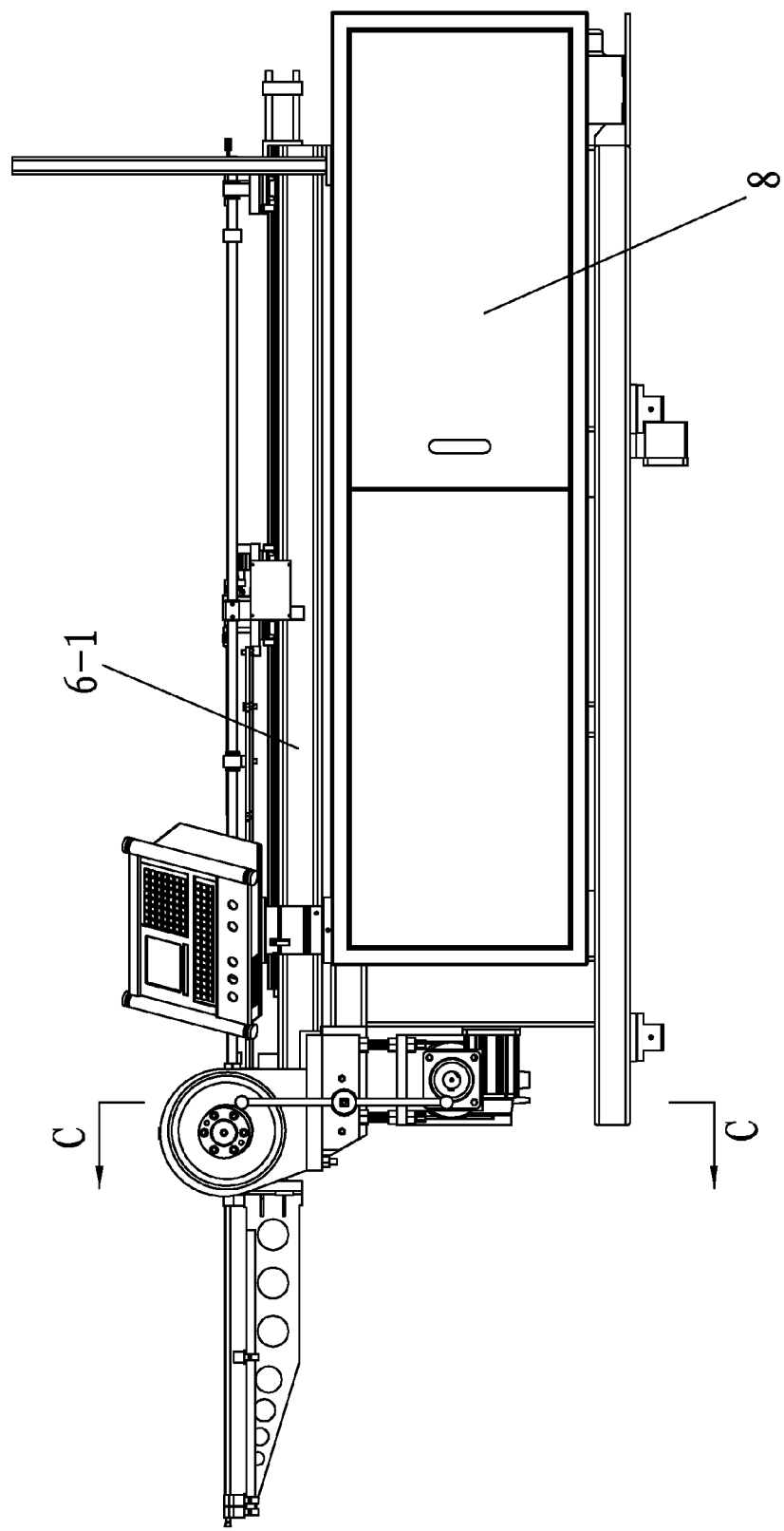
FIG. 12 is a front view of a controller, a bending device, and a second position switching assembly in accordance with one embodiment of the invention.

The locating mechanism 42 comprises: a front locating member 42-1, and a rear locating member 42-2, both of which are disposed on the frame 2. The first bottom plate 4-1 comprises: a front locating surface 4-1-1, and a rear locating surface 4-1-2. When the first bottom plate 4-1 is at the first operating position (as shown in FIGS. 10-11), the front locating surface 4-1-1 leans against the front locating member 42-1; and a distance between the rear locating surface 4-1-2 and the rear locating member 42-2 is equal to the distance between the first operating position and the second operating position. When the first bottom plate 4-1 is at the second operating position, the rear locating surface 4-1-2 leans against the rear locating member 42-2.

The first guiding mechanism 40 comprises: a guide rail 40-1 longitudinally fixed on the frame 2, and a sliding block 40-2 fixed on a bottom of the first bottom plate 4-1. The sliding block 40-2 slidably fits the guide rail 40-1 and slides in a longitudinal direction.

The first switching mechanism 41 comprises: a front pusher 41-1, and a rear pusher 41-2, both of which are disposed on the frame 2. When the first bottom plate 4-1 is at the first operating position, a front end of the rear pusher 41-2 leans against the rear locating surface 4-1-2; and when the first bottom plate 4-1 is at the second operating position, a rear end of the front pusher 41-1 leans against the front locating surface 4-1-1. The front pusher 41-1 and the rear pusher 41-2 also have functions in locking the first bottom plate 4-1.

The front locating member 42-1, the rear locating member 42-2, the front pusher 41-1, and the rear pusher 41-2 are all bolts.

As shown in FIGS. 10-11, when the first bottom plate 4-1 is at the first operating position, the feeding channel S1 is aligned with the feeding path. To switch to the second operating position, screw the rear pusher 41-2 out to unlock the first bottom plate 4-1; screw the front pusher 41-1 in to touch the front locating surface 4-1-1 of the first bottom plate 4-1, continue screwing until the rear locating surface 4-1-2 leans against to the rear locating member 42-2. Thus, the first bottom plate 4-1 is switched to the second operating position, and the feeding channel S2 is aligned with the feeding path.

The bending device 6 comprises: the bending stand 6-1, a second bottom plate 6-2, a bending mould 6-3, and a threaded coupling mechanism (not shown in the figures). A rotational center line of the bending mould 6-3 is longitudinally arranged. The bending mould 6-3 comprises two bending channels. The second bottom plate 6-2 is fixed on the bending stand 6-1 via the threaded coupling mechanism. The bending stand 6-1 is slidably disposed on the base 1 via a rail.

The second position switching assembly, which is used to adjust positions of the two bending channels, comprises: a longitudinal locating mechanism 60, a lifting locating mechanism 61, a second guiding mechanism 62, and a second switching mechanism 63. The second bottom plate 6-2 comprises a first operating position and a second operating position on the bending stand 6-1; and a preset longitudinal difference and a preset height difference exist between the first operating position and the second operating position.

The longitudinal locating mechanism 60 comprises: a front locating member 60-1, and a rear locating member 60-2, both of which are disposed on the second bottom plate 6-2.

The bending stand 6-1 comprises: a front locating surface 6-1-1, and a rear locating surface 6-1-2. When the second bottom plate 6-2 is at the first operating position, the front locating surface 6-1-1 leans against the front locating member 60-1; and the distance between the rear locating surface 6-1-2 and the rear locating member 60-2 is equal to the longitudinal distance between the first operating position and the second operating position.

When the second bottom plate 6-2 is at the second operating position, the rear locating surface 6-1-2 leans against the rear locating member 60-2.

The lifting locating mechanism 61 comprises: three sliding keys, and three grooves 61-2.

The bending stand 6-1 comprises a supporting surface 6-1-3 on a top of which the sliding keys are fixed. A part of each sliding key, which protrudes from the supporting surface 6-1-3, comprises: a horizontal plane 61-1-1, an inclined plane 61-1-2, and an intersection 61-1-3 where the horizontal plane 61-1-1 and the inclined plane 61-1-2 intersect. All horizontal planes 61-1-1 are of the same height; all inclined planes 61-1-2 are parallel with each other; and all intersections 61-1-3 are transversely arranged. A height difference between the supporting surface 6-1-3 and the horizontal plane 61-1-1 is equal to the height difference between the first operating position and the second operating position.

When the second bottom plate 6-2 is at the first operating position, a bottom surface 6-2-1 of the second bottom plate 6-2 attaches to the supporting surface 6-1-3 of the bending stand 6-1; and when the second bottom plate 6-2 is at the second operating position, the bottom surface 6-2-1 of the second bottom plate 6-2 attaches to the horizontal plane 61-1-1 of the sliding key.

The groove 61-2 is arranged on the bottom surface 6-2-1 of the second bottom plate 6-2. When the second bottom plate 6-2 is at the first operating position, the groove 61-2 accommodates a protruding part of the sliding key. The groove 61-2 comprises a side wall 61-2-1 which is inclined and is in parallel with the inclined plane 61-1-2 of the sliding key. During the switch of the second bottom plate 6-2 between the first operating position and the second operating position, the side wall 61-2-1 attaches to the inclined plane 61-1-2.

The second switching mechanism 63 drives the second bottom plate 6-2 to move between the first operating position and the second operating position along a direction determined by the second guiding mechanism 62.

The second guiding mechanism 62 comprises: a guiding bar 62-1, and a guiding slot 62-2. The guiding bar 62-1 is disposed on the supporting surface 6-1-3, and the guiding slot 62-2 is arranged on the bottom surface 6-2-1 of the second bottom plate 6-2. The guiding bar 62-1 is received by the guiding slot 62-2 and is movable along the guiding slot 62-2 in the longitudinal direction.

The second switching mechanism 63 comprises: a nut (not shown in the FIGS.), a screw 63-1, and a handle 63-2. The nut is disposed on the bending stand 6-1. The handle 63-2 is disposed on a front end of the screw 63-1. The screw 63-1 is rotationally through a mounting pedestal 6-2-2 of the second bottom plate 6-2, and a middle part of the screw 63-1 is axially positioned on the mounting pedestal 6-2-2 via a bearing 63-3. The nut is mounted on a rear part of the screw 63-1.

Figure 13:
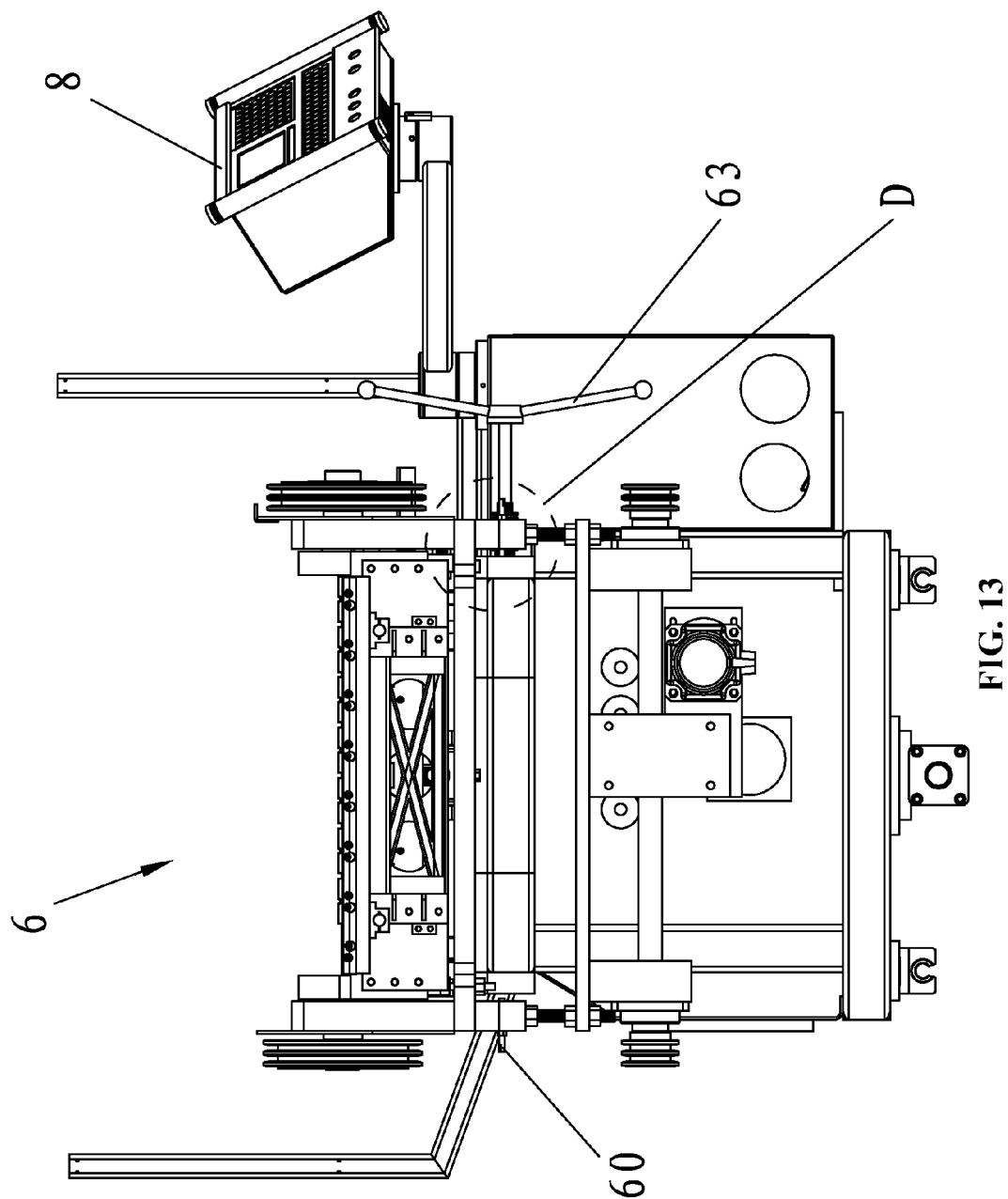
FIG. 13 is a right view of FIG. 12.
Figure 14:
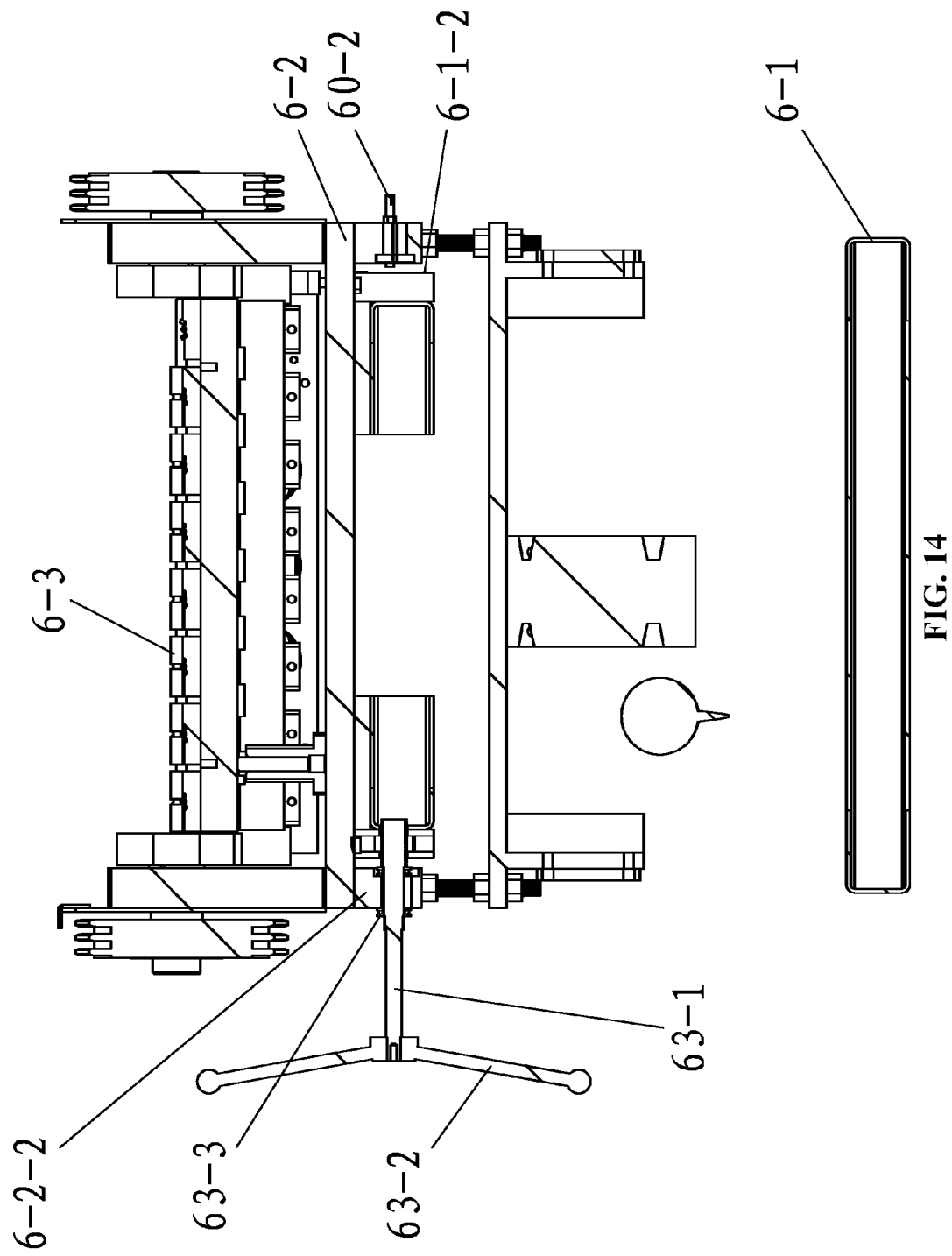
FIG. 14 is an enlarged cross-sectional view taken from line C-C of FIG. 12.
Figure 15:
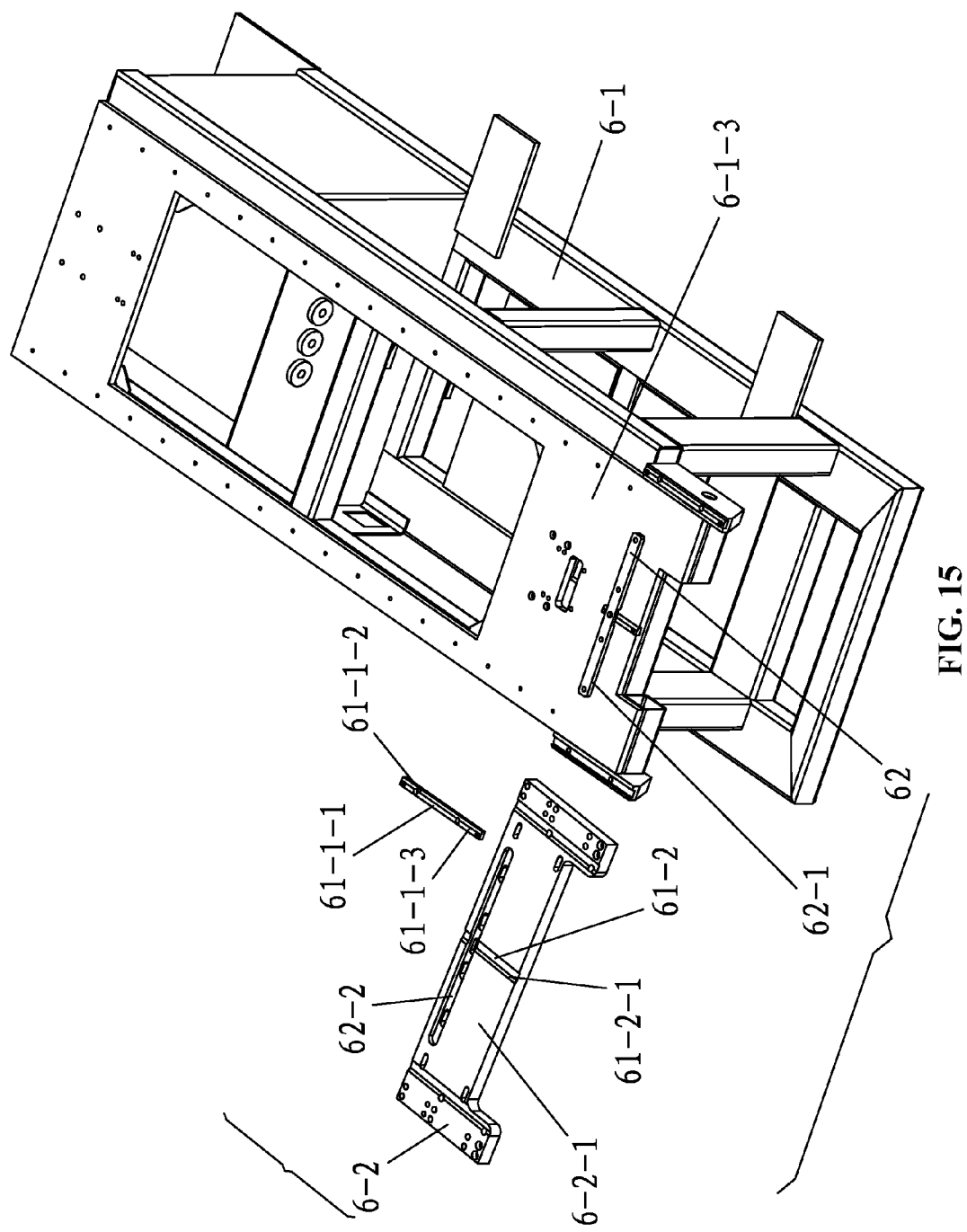
FIG. 15 is an exploded view of a second bottom plate, a sliding key, and a bending stand in accordance with one embodiment of the invention.
Figure 16:
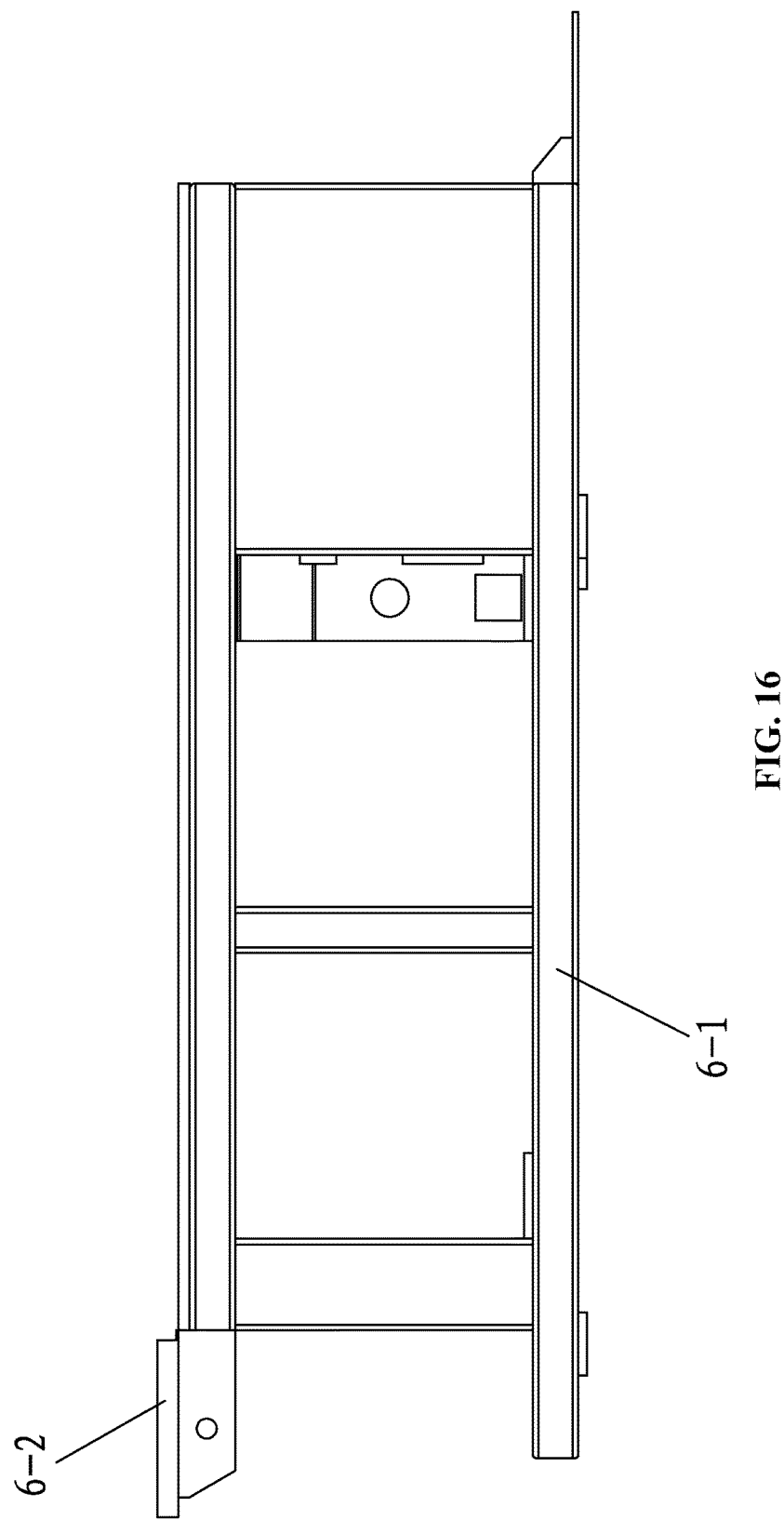
FIG. 16 is a front view of a second bottom plate, a sliding key, and a bending stand in an assembled state in accordance with one embodiment of the invention.
Figure 17:
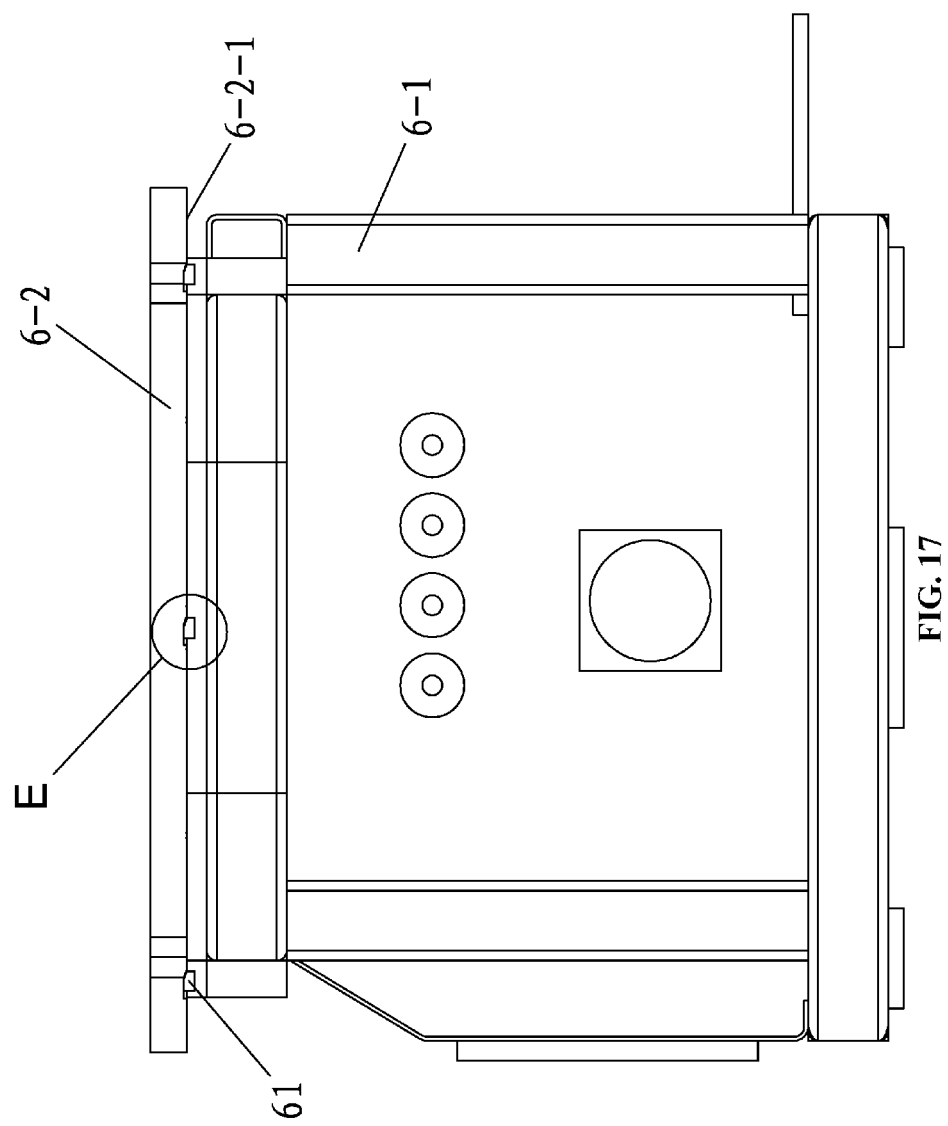
FIG. 17 is an enlarged right view of FIG. 16.
Figure 18:
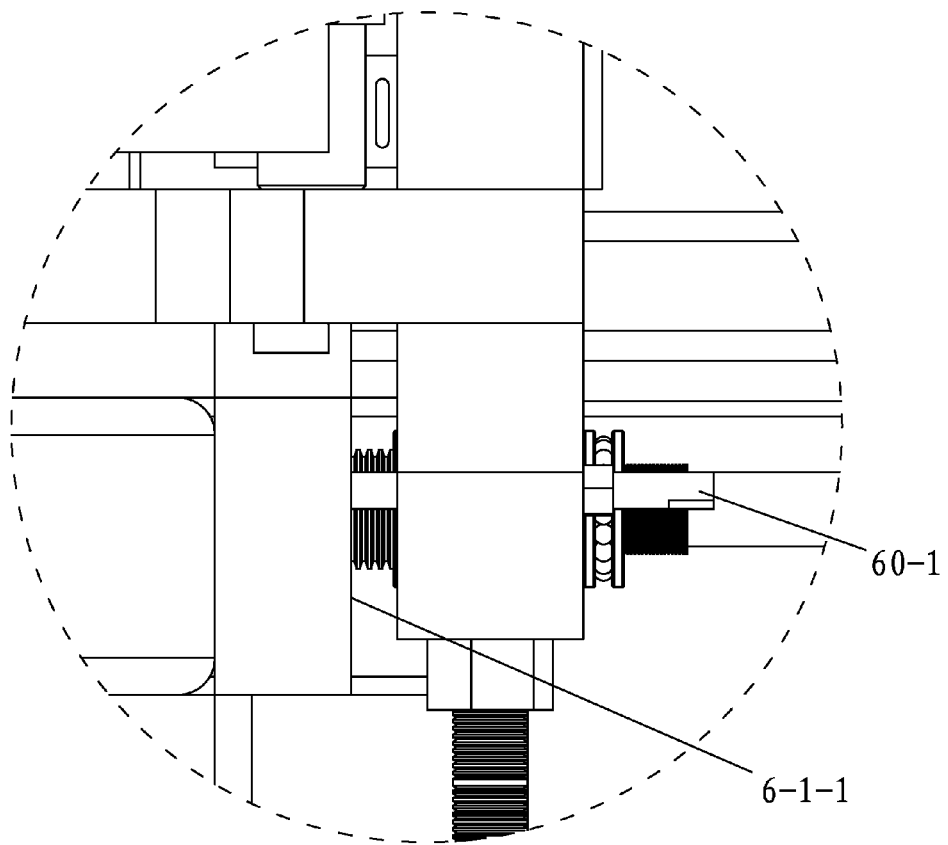
FIG. 18 is an enlarged view of part D of FIG. 13.
Figure 19:
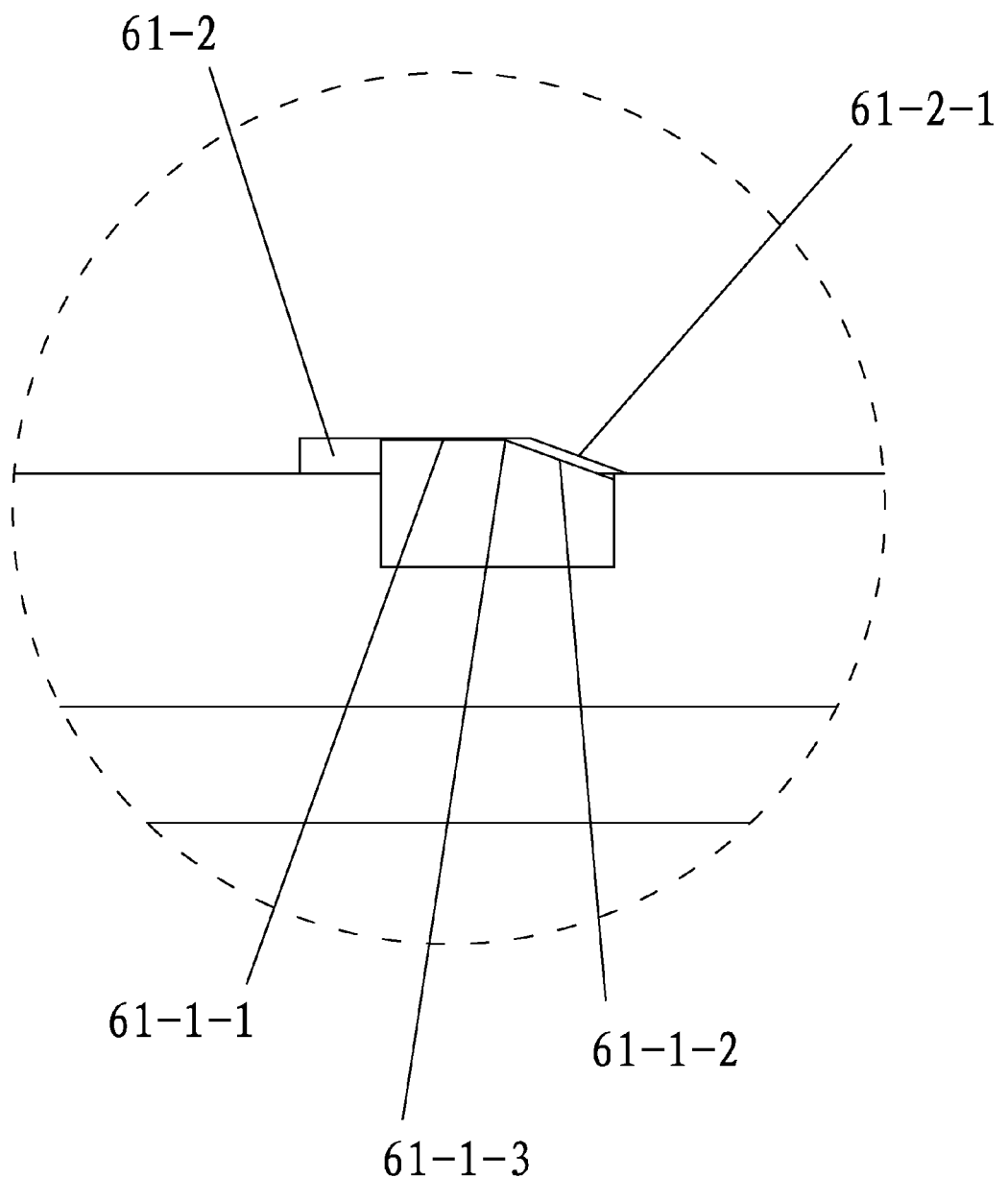
FIG. 19 is an enlarged view of part E of FIG. 17.

As shown in FIGS. 13, 14, and 17, the second bottom plate 6-2 is at the first operating position. To switch to the second operating position, unfix the second bottom plate 6-2 from the bending stand 6-1 via the threaded coupling mechanism, rotate the handle 63-2 to push the second bottom plate 6-2 via the rotation of the screw 63-1, and finally fix the second bottom plate 6-2 via the threaded coupling mechanism, after the second bottom plate 6-2 being switched to the second operating position.

The front locating member 60-1 and the rear locating member 60-2 are all bolts disposed on the mounting pedestal 6-2-2.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A pipe bender, comprising:
a) a base;
b) a frame, the frame comprising a position switching mechanism and a first position switching assembly;
c) a calibration device;
d) a feeding device;
e) a cutting device;
f) a feeding path;
g) a bending device comprising a bending stand, the bending stand comprising a second position switching assembly; and
h) a controller;
wherein:
the frame is fixed on the base;
the calibration device and the feeding device are disposed on and supported by the frame;
the cutting device, the bending device, and the controller are disposed on and supported by the base;
the feeding path is arranged on the base;
the calibration device, the feeding device, the cutting device, and the bending device are consecutively arranged along a first axis, wherein the first axis is horizontal with respect to the ground;
the feeding path is arranged along the first axis;
the calibration device comprises two calibration mechanisms each comprising a processing channel having an individual size;
the two calibration mechanisms separately calibrate two kinds of pipes having different diameters;
the position switching mechanism is adapted for adjusting positions of the two calibration mechanisms and aligning one of the two processing channels with the feeding path;
the feeding device comprises two feeding channels having different sizes;
the two feeding channels are adapted for transporting the two kinds of pipes, respectively;
the first position switching assembly is adapted for aligning one of the two feeding channels with the feeding path;
the bending device comprises two bending channels having different sizes;
the two bending channels are adapted for bending the two kinds of pipes, respectively;
the second position switching assembly is adapted for aligning one of the two bending channels with the feeding path;
the position switching mechanism, the first position switching assembly, and the second position switching assembly are independent from one another; and
operations of the position switching mechanism, the first position switching assembly, and the second position switching assembly are independent from one another.

2. The pipe bender of claim 1, wherein:
the position switching mechanism comprises a lifting guide member, a lifting drive member, an upper board, and a lower board;
the two calibration mechanisms are disposed on the upper board and the lower board, respectively;
the lifting guide member is fixed on the frame and fits slidably with the upper board and the lower board so that the upper board and the lower board are movable along a second axis with respect to the lifting guide member, wherein the second axis is vertical with respect to the ground;
the upper board is fixedly disposed above the lower board via a spacer;
the lifting drive member is disposed between the frame and the lower board; and
driven by the lifting drive member, the upper board and the lower board are lifted or descended so that one of the two processing channels is aligned with the feeding path.

3. The pipe bender of claim 2, wherein:
the lifting guide member comprises four guide pillars uprightly fixed on the frame along the second axis;
the upper board and the lower board are square in shape, and each of the four guide pillars extends through one of the four corners of each board;
a bearing sleeve is fixed at each corner of each board, and each of the four guide pillars extends through one of the bearing sleeves of each board for guiding;
the lifting drive member is a cylinder uprightly fixed on the frame, and a piston rod of the cylinder is extended along the second axis and is in fixed connection with the lower board; and
the spacer comprises four sleeves, and each of the four sleeves slidably encloses one of the four guide pillars.

4. The pipe bender of claim 3, wherein
the frame comprises a limiting column, and when the lower board leans against a top of the limiting column, the processing channel of the calibration mechanism of the upper board is aligned with the feeding path; and
the frame further comprises a removable cushion pillar, and when the lower board leans against a top of the removable cushion pillar, the processing channel of the calibration mechanism of the lower board is aligned with the feeding path.

5. The pipe bender of claim 1, wherein:
the feeding device comprises a first bottom plate movable between a first operating position and a second operating position on the frame, and a distance between the first operating position and the second operating position is equal to a distance between centers of the two feeding channels;
when the first bottom plate is at the first operating position, one feeding channel is aligned with the feeding path;
when the first bottom plate is at the second operating position, the other feeding channel is aligned with the feeding path;
the first position switching assembly comprises a first guiding mechanism, a first switching mechanism, and a locating mechanism;
the first switching mechanism drives the first bottom plate to move between the first operating position and the second operating position along a direction determined by the first guiding mechanism; and
the locating mechanism locates the first bottom plate on the frame and aligns an anticipated feeding channel with the feeding path.

6. The pipe bender of claim 5, wherein:
the locating mechanism comprises a first front locating member and a first rear locating member, both of which are disposed on the frame;
the first bottom plate comprises a first front locating surface and a first rear locating surface;
when the first bottom plate is at the first operating position, the first front locating surface leans against the first front locating member; and a distance between the first rear locating surface and the first rear locating member is equal to the distance between the first operating position and the second operating position; and when the first bottom plate is at the second operating position, the first rear locating surface leans against the first rear locating member.

7. The piper bender of claim 6, wherein:

the first guiding mechanism comprises a guide rail fixed on the frame along a third axis, and a sliding block fixed on a bottom of the first bottom plate, wherein the third axis is horizontal to the ground and is perpendicular to the first axis;

the sliding block slidably fits with the guide rail and slides along the third axis;

the first switching mechanism comprises a front pusher and a rear pusher, both of which are disposed on the frame;

when the first bottom plate is at the first operating position, a front end of the rear pusher leans against the first rear locating surface; and when the first bottom plate is at the second operating position, a rear end of the front pusher leans against the first front locating surface.

8. The pipe bender of claim 7, wherein the first front locating member, the first rear locating member, the front pusher, and the rear pusher are all bolts.

9. The pipe bender of claim 1, wherein:

the bending device further comprises a second bottom plate, and a bending mould;

the bending mould comprises a rotational center line arranged along the third axis, and the two bending channels are disposed on the bending mould;

the second bottom plate is fixed on the bending stand;

the second position switching assembly comprises a longitudinal locating mechanism for locating positions of the two bending channels along the third axis, a lifting locating mechanism, a second guiding mechanism, and a second switching mechanism;

the second bottom plate is movable between a third operating position and a fourth operating position on the bending stand, and a preset first distance and a preset second distance exist between the third operating position and the fourth operating position, wherein the preset first distance is on a first plane across the first axis and the third axis, and the preset second distance is on a second plane across the second axis;

the longitudinal locating mechanism comprises a second front locating member, and a second rear locating member, both of which are disposed on the second bottom plate;

the bending stand comprises a second front locating surface, and a second rear locating surface;

when the second bottom plate is at the third operating position, the second front locating surface leans against the second front locating member, and a distance between the second rear locating surface and the second rear locating member is equal to the preset first distance between the third operating position and the fourth operating position;

when the second bottom plate is at the fourth operating position, the second rear locating surface leans against the second rear locating member;

the lifting locating mechanism comprises at least two sliding keys and at least two grooves;

the bending stand comprises a supporting surface on which the sliding keys are fixed; a part of each sliding key protrudes from the supporting surface and comprises a horizontal plane and an inclined plane with respect to the ground; all the horizontal planes are of the same height; all the inclined planes are parallel with each other; the horizontal plane and the inclined plane intersect to form an intersection arranged along the third axis; a difference along the second axis between the supporting surface and the horizontal plane is equal to the preset second distance between the third operating position and the fourth operating position;

when the second bottom plate is at the third operating position, a bottom surface of the second bottom plate attaches to the supporting surface;

when the second bottom plate is at the fourth operating position, the bottom surface of the second bottom plate attaches to the horizontal plane;

each groove is arranged on the bottom surface of the second bottom plate; when the second bottom plate is at the third operating position, the groove accommodates the protruding part of the sliding key; the groove comprises a side wall which is inclined with respect to the ground and in parallel with the inclined plane; during a movement of the second bottom plate between the third operating position and the fourth operating position, the side wall attaches to the inclined plane; and the second switching mechanism drives the second bottom plate to move along a direction determined by the second guiding mechanism between the third operating position and the fourth operating position.

10. The pipe bender of claim 9, wherein:

the second guiding mechanism comprises a guiding bar and a guiding slot; the guiding bar is fixed on the supporting surface, and the guiding slot is arranged on the bottom surface of the second bottom plate; the guiding bar is received by the guiding slot and is movable along the guiding slot along the third axis; and the second switching mechanism comprises a screw and a handle; the handle is disposed on a front end of the screw; the screw rotationally extends through a mounting pedestal of the second bottom plate, and a middle part of the screw is axially positioned on the mounting pedestal via a bearing.

11. A pipe bender, comprising:

a) a base;
b) a frame, the frame comprising a position switching mechanism and a first position switching assembly;
c) a calibration device;
d) a feeding device;
e) a cutting device;
f) a feeding path;
g) a bending device comprising a bending stand, the bending stand comprising a second position switching assembly; and
h) a controller;

wherein:

the frame is fixed on the base;

the calibration device and the feeding device are disposed on and supported by the frame;

the cutting device, the bending device, and the controller are disposed on and supported by the base;

the feeding path is arranged on the base;

the calibration device, the feeding device, the cutting device, and the bending device are consecutively arranged along a first axis, wherein the first axis is horizontal with respect to the ground;
the feeding path is arranged along the first axis;
the calibration device comprises two calibration mechanisms each comprising a processing channel having an individual size;
the two calibration mechanisms separately calibrate two kinds of pipes having different diameters;
the position switching mechanism is adapted for adjusting positions of the two calibration mechanisms and aligning one of the two processing channels with the feeding path;
the feeding device comprises two feeding channels having different sizes;
the two feeding channels are adapted for transporting the two kinds of pipes, respectively;
the first position switching assembly is adapted for aligning one of the two feeding channels with the feeding path;
the bending device comprises two bending channels having different sizes;
the two bending channels are adapted for bending the two kinds of pipes, respectively;
the second position switching assembly is adapted for aligning one of the two bending channels with the feeding path; and the two calibration mechanisms are disposed along a second axis, and the position switching mechanism is adapted for raising or lowering the two calibration mechanisms along the second axis, wherein the second axis is vertical with respect to the ground.

12. The pipe bender of claim 11, wherein:
the position switching mechanism comprises a lifting guide member, a lifting drive member, an upper board, and a lower board;
the two calibration mechanisms are disposed on the upper board and the lower board, respectively;
the lifting guide member is fixed on the frame and fits slidably with the upper board and the lower board so that the upper board and the lower board are movable along the second axis with respect to the lifting guide member;
the upper board is fixedly disposed above the lower board via a spacer;
the lifting drive member is disposed between the frame and the lower board; and
driven by the lifting drive member, the upper board and the lower board are lifted or descended so that one of the two processing channels is aligned with the feeding path.

13. The pipe bender of claim 12, wherein:
the lifting guide member comprises four guide pillars uprightly fixed on the frame along the second axis;
the upper board and the lower board are square in shape, and each of the four guide pillars extends through one of the four corners of each board;
a bearing sleeve is fixed at each corner of each board, and each of the four guide pillars extends through one of the bearing sleeves of each board for guiding;
the lifting drive member is a cylinder uprightly fixed on the frame, and a piston rod of the cylinder is extended along the second axis and is in fixed connection with the lower board; and
the spacer comprises four sleeves, and each of the four sleeves slidably encloses one of the four guide pillars.

14. The pipe bender of claim 13, wherein
the frame comprises a limiting column, and when the lower board leans against a top of the limiting column, the processing channel of the calibration mechanism of the upper board is aligned with the feeding path; and
the frame further comprises a removable cushion pillar, and when the lower board leans against a top of the removable cushion pillar, the processing channel of the calibration mechanism of the lower board is aligned with the feeding path.

15. The pipe bender of claim 11, wherein:
the feeding device comprises a first bottom plate movable between a first operating position and a second operating position on the frame, and a distance between the first operating position and the second operating position is equal to a distance between centers of the two feeding channels;
when the first bottom plate is at the first operating position, one feeding channel is aligned with the feeding path;
when the first bottom plate is at the second operating position, the other feeding channel is aligned with the feeding path;
the first position switching assembly comprises a first guiding mechanism, a first switching mechanism, and a locating mechanism;
the first switching mechanism drives the first bottom plate to move between the first operating position and the second operating position along a direction determined by the first guiding mechanism; and
the locating mechanism locates the first bottom plate on the frame and aligns an anticipated feeding channel with the feeding path.

16. The pipe bender of claim 15, wherein:
the locating mechanism comprises a first front locating member and a first rear locating member, both of which are disposed on the frame;
the first bottom plate comprises a first front locating surface and a first rear locating surface;
when the first bottom plate is at the first operating position, the first front locating surface leans against the first front locating member; and a distance between the first rear locating surface and the first rear locating member is equal to the distance between the first operating position and the second operating position; and
when the first bottom plate is at the second operating position, the first rear locating surface leans against the first rear locating member.

17. The piper bender of claim 16, wherein:
the first guiding mechanism comprises a guide rail fixed on the frame along a third axis, and a sliding block fixed on a bottom of the first bottom plate, wherein the third axis is horizontal to the ground and is perpendicular to the first axis;
the sliding block slidably fits with the guide rail and slides along the third axis;
the first switching mechanism comprises a front pusher and a rear pusher, both of which are disposed on the frame;
when the first bottom plate is at the first operating position, a front end of the rear pusher leans against the first rear locating surface; and
when the first bottom plate is at the second operating position, a rear end of the front pusher leans against the first front locating surface.

18. The pipe bender of claim 17, wherein the first front locating member, the first rear locating member, the front pusher, and the rear pusher are all bolts.

19. The pipe bender of claim 11, wherein:
the bending device further comprises a second bottom plate, and a bending mould;
the bending mould comprises a rotational center line arranged along the third axis, and the two bending channels are disposed on the bending mould;
the second bottom plate is fixed on the bending stand;
the second position switching assembly comprises a longitudinal locating mechanism for locating positions of the two bending channels along the third axis, a lifting locating mechanism, a second guiding mechanism, and a second switching mechanism;
the second bottom plate is movable between a third operating position and a fourth operating position on the bending stand, and a preset first distance and a preset second distance exist between the third operating position and the fourth operating position, wherein the preset first distance is on a first plane across the first axis and the third axis, and the preset second distance is on a second plane across the second axis;
the longitudinal locating mechanism comprises a second front locating member, and a second rear locating member, both of which are disposed on the second bottom plate;
the bending stand comprises a second front locating surface, and a second rear locating surface;
when the second bottom plate is at the third operating position, the second front locating surface leans against the second front locating member, and a distance between the second rear locating surface and the second rear locating member is equal to the preset first distance between the third operating position and the fourth operating position;
when the second bottom plate is at the fourth operating position, the second rear locating surface leans against the second rear locating member;
the lifting locating mechanism comprises at least two sliding keys and at least two grooves;
the bending stand comprises a supporting surface on which the sliding keys are fixed; a part of each sliding key protrudes from the supporting surface and comprises a horizontal plane and an inclined plane with respect to the ground; all the horizontal planes are of the same height; all the inclined planes are parallel with each other; the horizontal plane and the inclined plane intersect to form an intersection arranged along the third axis; a difference along the second axis between the supporting surface and the horizontal plane is equal to the preset second distance between the third operating position and the fourth operating position;
when the second bottom plate is at the third operating position, a bottom surface of the second bottom plate attaches to the supporting surface;
when the second bottom plate is at the fourth operating position, the bottom surface of the second bottom plate attaches to the horizontal plane;
each groove is arranged on the bottom surface of the second bottom plate; when the second bottom plate is at the third operating position, the groove accommodates the protruding part of the sliding key; the groove comprises a side wall which is inclined with respect to the ground and in parallel with the inclined plane; during a movement of the second bottom plate between the third operating position and the fourth operating position, the side wall attaches to the inclined plane; and
the second switching mechanism drives the second bottom plate to move along a direction determined by the second guiding mechanism between the third operating position and the fourth operating position.

20. The pipe bender of claim 19, wherein:
the second guiding mechanism comprises a guiding bar and a guiding slot; the guiding bar is fixed on the supporting surface, and the guiding slot is arranged on the bottom surface of the second bottom plate; the guiding bar is received by the guiding slot and is movable along the guiding slot along the third axis; and
the second switching mechanism comprises a screw and a handle; the handle is disposed on a front end of the screw; the screw rotationally extends through a mounting pedestal of the second bottom plate, and a middle part of the screw is axially positioned on the mounting pedestal via a bearing.

\* \* \* \* \*